United States Patent Office 3,719,253
Patented Mar. 6, 1973

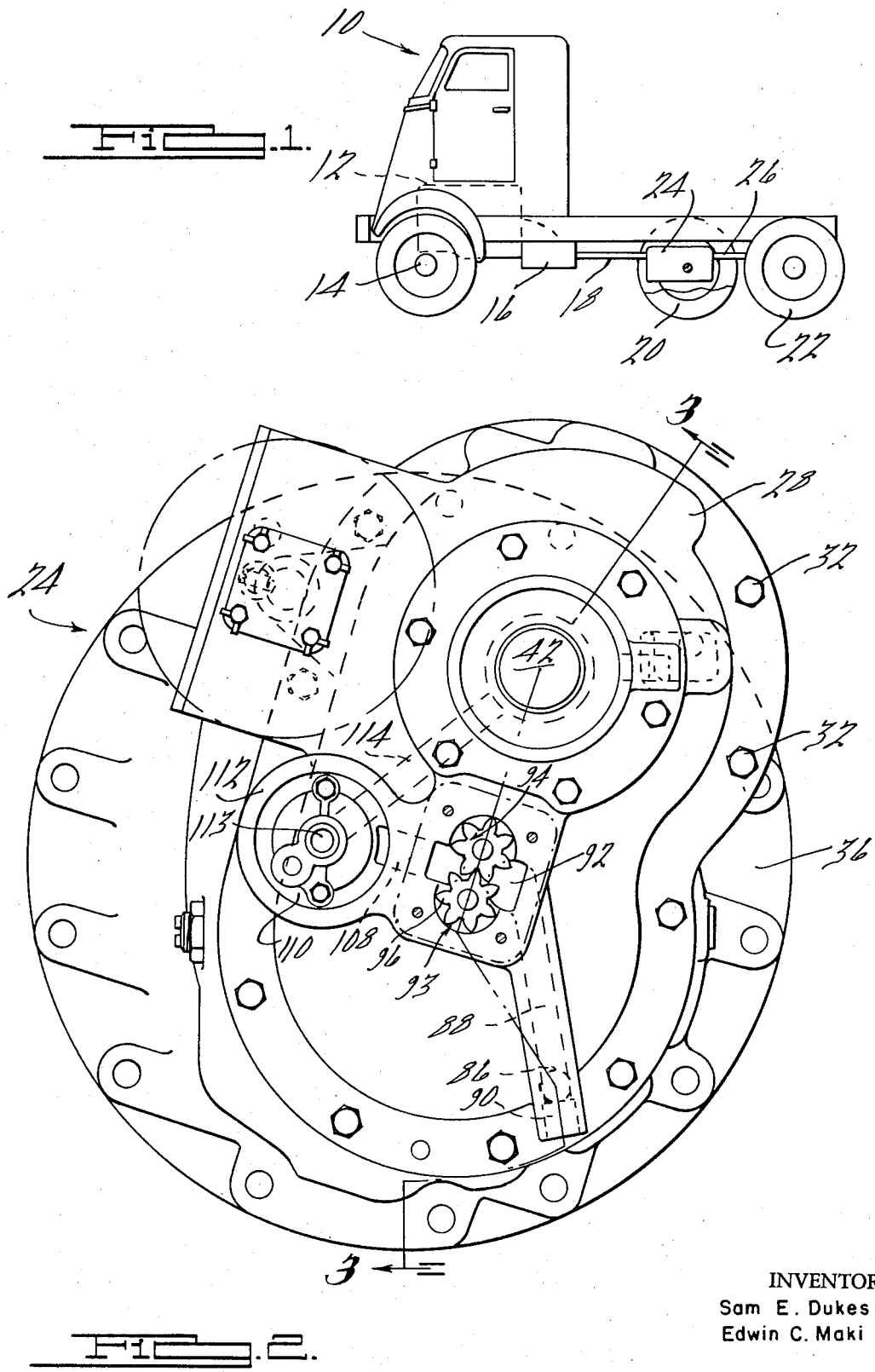

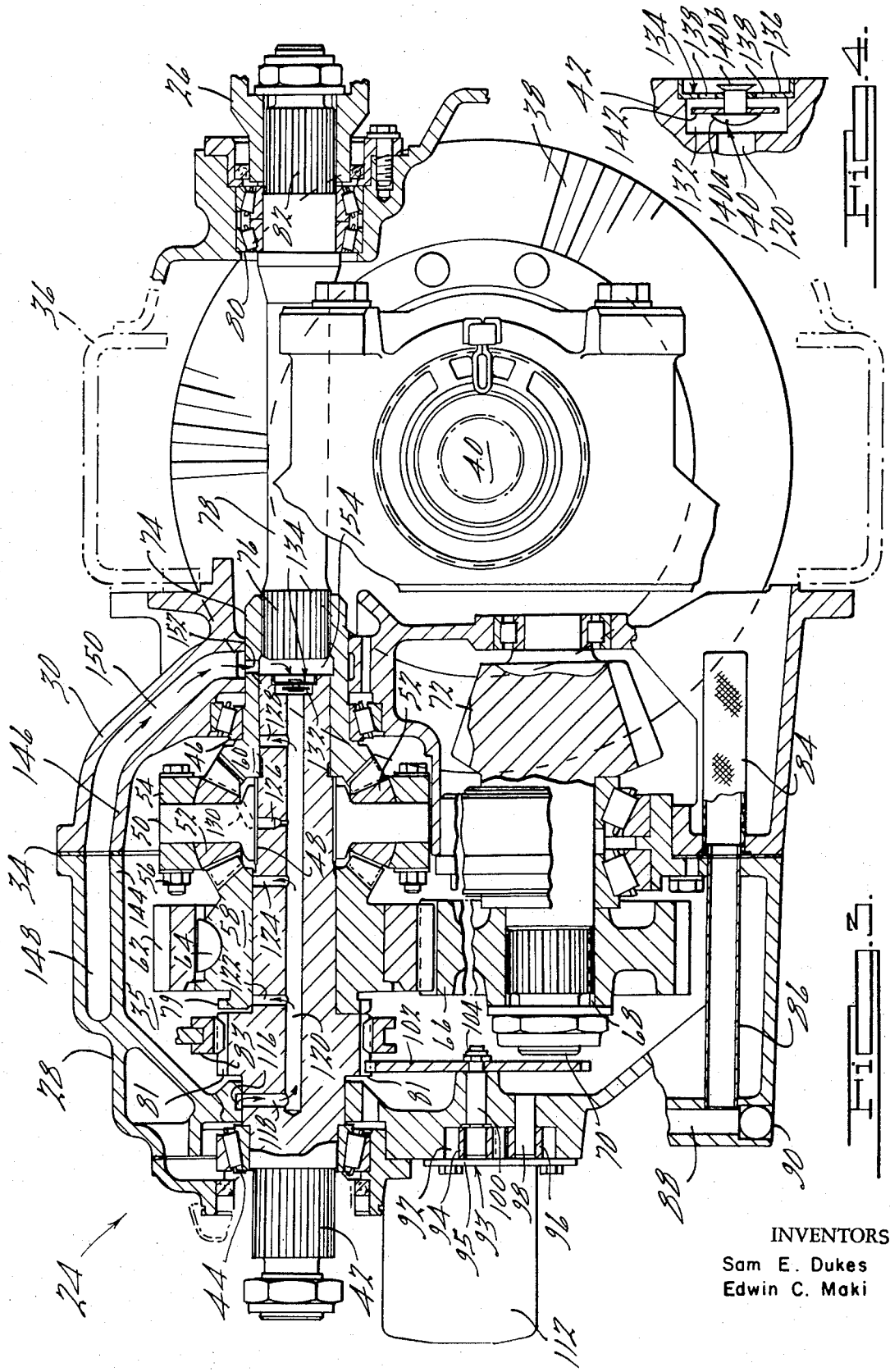

3,719,253
LUBRICATING SYSTEM FOR POWER
TRANSMITTING APPARATUS
Sam E. Dukes, Detroit, and Edwin C. Maki, Bloomfield
Hills, Mich., assignors to North American Rockwell
Corporation, Pittsburgh, Pa.
Filed July 13, 1971, Ser. No. 162,176
Int. Cl. F16n 7/36
U.S. Cl. 184—6.12
12 Claims

ABSTRACT OF THE DISCLOSURE

A lubrication system for a power transmitting apparatus comprising an outer casing defining a center chamber including a liquid lubricant sump, a shaft journalled for rotation within the casing and gear means located within the chamber and operatively connected to the shaft. A lubrication passage is formed within the shaft. This passage has two openings to exterior of the shaft for the introduction of lubricant to the passage. First lubricant supply means supply lubricant from the sump to one of the passage openings at a predetermined pressure and second lubricant supply means supply lubricant from the sump to the other of the openings at a pressure less than the predetermined pressure. One way valve means are located in the other of the openings and prevent the flow of lubricant to the passage through the second opening only when the fluid pressure within the passage is less than the fluid pressure outside the passage and proximate the second opening.

BACKGROUND OF THE INVENTION

Motor vehicles including at least two driving axles conventionally utilize an interaxle differential to proportion torque between the driving axles and permit differential rotation of these axles. A factor limiting the capacity, efficiency and useful working life of such interaxle differentials historically has been the ability of the interaxle differential design to provide for an adequate supply of lubricant to critical locations within the differential structure.

Conventionally, such interaxle differential mechanisms are located within a single housing chamber with associated gearing, such as the gearing transmitting power from the differential to the input of one of the driving axles. The chamber defined by the casing is filled partially with liquid lubricant such that gear rotation causes a splashing of the lubricant throughout the chamber. Various means are provided to entrap splashed lubricant and direct this liquid utilizing the force of gravity to critical areas requiring lubrication. The most critical of such areas in many interaxle differential designs are the interfaces between the outer periphery of the power input shaft and structure surrounding the shaft that does not move in unison therewith, for example, the differential mechanism side gears. To provide lubrication at these interfaces, power input shafts have been formed with internal lubrication galleries having a main lubrication passage and output passages to the critical locations on the surfaces of the shaft. It is common for such galleries to be supplied splashed lubricant by gravity.

Interaxle differential lubrication systems such as that described above have functioned satisfactorily in vehicles utilized in slow speed, off road applications or other stop and go operating conditions. A problem has arisen, however, when vehicles including such interaxle differentials have been driven for extended periods of time at relatively fast highway speeds. During such on highway operation, the relatively fast movement of parts creates centrifugal forces tending to hold the splashed lubricant about the periphery of the housing chamber, thus impeding the gravity flow of the splashed lubricant to areas such as the input shaft gallery where the presence of lubricant critically is needed. Although interaxle differentials have been designed specifically for on highway, high speed applications, this has not proven a totally satisfactory solution to the problem since it is desirable to have interaxle differentials and associated axles that may be utilized on both on and off highway equipment. Also, certain vehicles, such as earth hauling trucks, often are subjected to both on and off highway operating conditions.

It is therefore an object of this invention to provide a lubrication system for power transmitting apparatus that will function equally well during stop and go, slow speed and high speed gearing operation. In particular, it is an object of this invention to provide a lubricating system for a vehicle interaxle differential, wherein the critical lubrication points surrounding the conventional mechanism input shaft are supplied with pressurized lubricant for maximum lubricating efficiency, but wherein conventional gravity fed lubrication of these points is available in the event of a failure of the lubricant pressurizing means.

SUMMARY OF THE INVENTION

The lubrication system of this invention is adapted for inclusion in a power transmitting device including an outer case defining a central chamber and a power transmitting shaft rotatably journalled in said casing. The shaft is formed with an internal lubrication gallery having a first opening to the exterior of the shaft interconnected with a source of pressurized lubricant such as a pump communicated with the lubricant sump at the bottom of the central chamber. This arrangement provides a supply of pressurized lubricant to the shaft lubrication gallery during pump operation. The gallery has a second opening to the exterior of the shaft interconnected with a source of gravity fed lubricant. A one-way valve is positioned in the second opening and permits lubricant flow through the second opening only from the exterior of the shaft into the gallery. The valve thus allows the gravity fed lubricant to enter the shaft gallery if the supply of pressurized lubricant to the gallery is interrupted as in the case of a pump failure.

DESCRIPTION OF THE DRAWINGS

FIG. 1 is a side elevation view of a motor vehicle including an interaxle differential having a lubrication system constructed in accordance with this invention;

FIG. 2 is an end elevational view, with parts broken away, of the interaxle differential included in the vehicle of FIG. 1;

FIG. 3 is a sectional view, with some parts broken away, taken along the line 3—3 of FIG. 2; and FIG. 4 is an enlarged view of the shaft lubrication gallery valve included in the apparatus of FIG. 3.

DETAILED DESCRIPTION OF THE DRAWINGS

Referring now in detail to the drawings and in particular to FIG. 1, the numeral 10 denotes generally a truck tractor of the type utilized for both stop and go and high speed, on highway work applications. Tractor 10 includes a prime mover 12 supported in large part by front wheels 14 that are mounted on a front steering axle. Power from the prime mover is transmitted through a conventional vehicle transmission 16 and a prop shaft 18. This power ultimately is applied to drive the vehicle through rear wheels 20 (one shown) mounted on a front rear drive axle and rear wheels 22 (one shown) mounted on a rear rear drive axle. The interconnection between prop shaft 18 and the two rear driving axles includes a gear box 24 enclosing both an interaxle differential and drive gearing for the front rear axle and a prop shaft 26 that interconnects the interaxle differential and the drive gearing for the rear rear axle. As is conventional, the interaxle differential provides for the distribution of torque between the two rear drive axles as well as allowing differential movement of these axles to compensate for such variables as tire size, road surface undulations and turning circle radii.

The gear box 24 is illustrated in detail in FIGS. 2 and 3 of the drawings. The composite housing of gear box 24 consists of front housing portion 28 and rear housing portion 30 that are cast members. These housing portions are joined together by fasteners 32 with the interface between the housing portions sealed by a gasket 34 that may be formed from synthetic rubber, plastic or other suitable gasket material. Housing portions 28 and 30 together define an internal gear box chamber 35 that is in communication with the interior of the front rear axle assembly defined by the front rear axle housing 36. The front rear axle is a conventional vehicle drive axle having a crown gear 38 and half shafts 40 (one illustrated) and includes a differential mechanism.

As best may be seen in FIG. 3, power from the vehicle transmission enters the gear box 24 by means of a differential power input shaft 42 that is suitably connected to prop shaft 18 by conventional expedient not illustrated. Shaft 42 is rotatably journalled in housing portions 28 and 30 by tapered bearings 44 and 46 respectively, that are capable of bearing thrust loads.

Splines 48 are formed about a portion of the periphery of shaft 42 and engage internal splines formed about the central opening of the differential planetary gear carrier 50. Carrier 50 is of conventional design and rotatably mounts a plurality of planet gears 52 (two shown) that are held on the gear carrier 50 by a gear cage 54 secured to the carrier by a nut and bolt arrangement 56.

Planet gears 52 engage both of side gears 58 and 60 that surround shaft 42 and are capable of rotation relative to shaft 42. Side gear 58 has secured about its outer periphery a driving drop gear 62 by means of a key 64. Driving drop gear 62 engages a driven drop gear 66 having internal splines 68 that engage external splines formed about the periphery of a shaft 70. The end of shaft 70 remote from drop gear 66 is enlarged and comprises a helical drive pinion 72. This pinion engages the crown gear 38 to drive the front rear drive axle in a conventional manner.

Side gear 60 is formed with an integral, elongate sleeve 74 extending therefrom that surrounds shaft 42. Sleeve 74 is formed with internal splines that engage the external splines 76 formed at one end of a differential output shaft 78 that extends rearwardly from the differential and is rotatably journalled in axle housing 36 by bearings 80. Splines 82 are formed about the periphery of shaft 78 at the shaft end remote from splines 76. Splines 82 are engaged by internal splines formed in the hollow end of prop shaft 26.

It thus readily may be appreciated that power from transmission 16 is directed to the front rear drive axle by means of prop shaft 18, shaft 42, gear carrier 50, planet gears 52, side gear 58, drop gears 62 and 66, shaft 68 and pinion 72. Power is transmitted to the rear rear drive axle through shaft 42, carrier 50, planet gears 52, side gear 60, shaft 78 and prop shaft 26. This structure provides, as discussed above, for both the proportioning of torque between the two drive axles as well as differential movement of the drive axles.

In the event the operating conditions of vehicle 10 demand that constant torque be transmitted to both rear drive axles, the differential mechanism may be locked. Differential locking is possible because of the gear teeth 79 formed on side gear 58 and the gear teeth 81 formed on shaft 42. Gear teeth 81 always engage internal gear teeth formed on a collar 83 that normally surrounds only shaft 42. When it is desired to terminate the differential capability of this structure, collar 83 is moved to the right as viewed in FIG. 3. This movement is accomplished by conventional actuating structure that comprises no part of this invention and causes the collar teeth to engage both gear teeth 81 and gear teeth 79. In this position, side gear 58 is locked for unitary rotation to both shaft 42 and carrier 50 and thus will rotate in unison with side gear 60 as is well known in the art.

The structure of gear box 24 described above is of conventional design. It has been found that lubrication problems are most critical in gearing of such design at the interfaces between the outer periphery of shaft 42 and those elements surrounding shaft 42 that do not rotate in unison with the shaft, for instance, the side gears 58 and 60. Also, it is critical for lubricant to be provided in the location of the interface between the planet gears 52 and the gear carrier 50. Conventionally, attempts have been made to accommodate such lubrication requirements by partially filling chamber 35 with liquid lubricant. As various moving parts, principally gear 66, rotate through the lubricant sump located at the lowermost portion of chamber 35, this movement causes a splashing of the lubricant about the gear casing, thus directing lubricant to locations where it is required. While such a lubrication scheme has been satisfactory when the vehicle 10 is operated at relatively low speeds or in stop and go situations, it has been found that extended high speed vehicle operation as will occur during on highway travel causes the splashed lubricant to collect, due to centrifugal force, about the outer periphery of chamber 35. The gravity force tending to distribute the splashed lubricant to the critical lubrication requirement locations thus is overcome by the centrifugal force. Lubricant supply requirements may not be fulfilled under these conditions with attendant damage to and possible failure of the apparatus.

The illustrated gear box 24 is provided with a lubrication system that obviates this problem and provides for a satisfactory supply of lubricant to all necessary locations regardless of vehicle operating conditions. This lubrication system includes a cylindrical screen 84 mounted by housing part 30 and located in the lubricant sump at the bottom of chamber 35 where screen 84 always will be submerged within the liquid lubricant. A lubricant supply tube 86 communicates between the interior of screen 84 and a cored passageway 88 formed in the cast housing portion 28. The opening of passageway 88 to exterior of the housing part 28 necessitated by casting techniques is sealed by a plug 90. The end of passageway 88 remote from tube 86 terminates in a recess 92 formed in the end wall of housing portion 28. Within recess 92 is located a gear pump designated generally by the reference numeral 93. Recess 92 is sealed against lubricant leakage by a pump cover 95.

Pump 93 is a conventional gear pump and includes a pair of gears 94 and 96. Gear 96 is rotatably mounted on a shaft 98 that extends from the end wall of housing portion 28 and gear 94 is mounted for unitary rotation on a shaft 100 that extends through the end wall of housing portion 28. The end of shaft 100 remote from gear 94 protrudes into chamber 35 and has mounted thereon a gear 102 held in place by a fastener 104. The teeth of gear 102 engage gear teeth 81 formed on shaft 42 so that upon rotation of shaft 42, power is transmitted through gear 102 and shaft 100 to gears 94 and 96. This power applied to the gear pump 93 causes lubricant to be drawn through screen 84, that acts as a wide gage filter, and passes through tube 86 and passageway 88 into the gear pump where it is pressurized.

As best may be seen in FIG. 2, the recess 92 that functions as a gear pump chamber is interconnected by means of a passage 108, formed in housing portion 28, with a circular groove 110 formed in the end wall of housing portion 28. A conventional lubricant filter 112 is secured by conventional fasteners not illustrated to the housing portion end wall at this point. Filter 112 is of conventional design having a peripheral input opening that registers with groove 110 and a centrally located output passage at 113 that registers with a passageway 114 formed through the body of housing portion 28. Lubricant pressurized by gear pump 93 thus is forced through passageway 108 and into filter 112 where it is filtered and from which it passes into passageway 114.

The passageway 114 communicates between the filter 112 and a circular groove 116 formed in housing portion 28 about the shaft 42. Groove 116 registers with an input passageway 118 of a lubrication gallery formed within shaft 42, which gallery includes a longitudinal main passageway 120. A plurality of exit passageways extend radially from passageway 120 to the locations about the periphery of shaft 42 where an uninterrupted supply of lubricant is necessary. Thus exit passageways 122 and 124 communicate between passageway 120 and the interface between the shaft 42 and side gear 58. Output passageway 126 registers with a passageway 130 extending through gear carrier 50 and output passageway 128 extends from passageway 120 to the interface between shaft 42 and side gear 60.

The end of passageway 120 remote from input passageway 118 is enlarged at 132 wherein is mounted a one-way valve 134. The precise structure of valve 134 will be explained below. It is sufficient at this time to note that valve 134 prohibits the flow of lubricant from passageway 120 to exterior of the shaft lubrication gallery.

As pressurized lubricant enters the lubrication gallery through passageway 118 and fills passageway 120, this lubricant is prevented from exiting the gallery by the valve 134. The lubrication gallery thus becomes pressurized and lubricant will flow through passageways 122, 124, 126, 128 and 130 to the critical locations requiring lubricant. As readily may be appreciated, this interconnection of the locations requiring a constant lubricant supply and a source of pressurized lubricant whenever rotation of shaft 42 occurs ensures that lubrication will be available regardless of the operating speed of vehicle 10. In fact, the faster the speed of vehicle 10, the faster the rotation of shaft 42 and the greater the volume of lubricant that will pass through pump 93 to the lubrication gallery formed within shaft 42.

The design of the lubrication system of gear box 24 takes cognizance of the fact that there are many factors tending to create a condition that would interrupt the proper functioning of a pressurized lubrication system. It is well known that lubricants such as those utilized in gear box applications and subjected to heavy truck usage are prone to develop sludge that may cause an interruption of liquid flow through a lubrication passage. Such sludge easily may accumulate in filter 112 causing a failure of the lubrication system if this filter is not periodically serviced or replaced. Also, the structural elements of gear pump 93, of necessity, are not constructed of such massive dimensions and structural strength as are the other elements in the gear box arrangement. It thus reasonably may be anticipated that the life of the gear pump will be less than the life of the gear box and that a gear pump failure could occur between periodic maintenance inspections of this apparatus. This invention thus provides for a supply of lubricant to those critical locations proximate the input shaft 42 even in the event of a failure of the lubrication system described above.

In order to provide for the operation of this alternate supply of lubricant to the lubrication gallery of the input shaft 42, the valve 134 illustrated in FIG. 4 of the drawings is utilized. As explained above, valve 134 is a one-way valve that prohibits liquid flow from the shaft lubrication gallery to exterior of the shaft—to the right as viewed in FIGS. 3 and 4. Valve 134 includes a sheet metal main body 136 mounted within the enlarged portion 132 at the extremity of passageway 120. A plurality of openings 138 are formed in main body 136. A rivet 140 extends through and is fixedly mounted to sheet metal main body 136. A large portion of the shank of rivet 140 extends into enlarged portion 132. The extremity of this portion of the rivet shank has formed thereon a large head 140a that holds in place a valve closure washer 142 that surrounds the rivet shank and is free to move axially along this shank. The exterior end of the rivet is formed with an enlarged head 140b that serves to help anchor the rivet 140 in the position shown.

Upon the introduction of pressurized lubricant to passageway 120, washer 142 will be forced to the right as viewed in FIG. 4 such that the washer closes the openings 138, thus preventing liquid flow through the valve and pressurizing the lubrication gallery of the shaft 42. It readily may be appreciated, however, that should liquid pressure exterior of shaft 42 (to the right of valve 134 as viewed in FIG. 4) exceed liquid pressure within passageway 120, washer 142 will move along the rivet shank into the position illustrated in FIG. 4 permitting liquid flow into enlarged portion 132 of passageway 120. The significance of this will be discussed below.

As may be seen in FIG. 3, within chamber 35 and cast as an integral part of housing portions 28 and 30 are structural members 144 and 146 that together comprise a ledge defining a catch basin 148 that is open to the central portion of chamber 35. As lubricant is splashed throughout the chamber 35 due to movement of gear 66 within the lubricant sump, a portion of this splashed lubricant will be entrapped in the catch basin 148. A passageway 150 leads from catch basin 148 and is slanted downward so that gravity will cause liquid entrapped in the catch basin to flow down the passageway 150, through opening 152 formed through the sleeve-like extension 74 of side gear 60 and into the space 154 between the ends of input shaft 42 and output shaft 78.

If pressurized lubricant from pump 93 is present within passageway 120 of the shaft lubrication gallery, the gravity fed liquid directed to space 154 will overflow from passageway 150 into the lubricant sump. If, however, due to any of the reasons detailed above, the lubricant pressure feed system supplying passageway 120 is inoperative, the pressure of the gravity fed lubricant in space 154 will cause valve 134 to open into the position illustrated in FIG. 4. This will allow the gravity fed lubricant to enter passageway 120 from which it will exit through the output passages 122–130 to supply the critical lubrication locations about the periphery of shaft 42.

This secondary, gravity fed lubrication system having its input through valve 134 to the shaft lubrication gallery thus provides a factor of safety ensuring at all times at least some lubrication about the periphery of shaft 42. This is true even in the event of the failure of the pressure lubrication system of which pump 93 is a part.

It thus may be seen that this invention provides a lubrication system for power transmitting apparatus, and in particular an interaxle differential, whereby lubricant is supplied to all critical lubrication points regardless of the operating conditions to which the differential and its associated apparatus are subjected. The lubricant supply primarily is by means of a pressurized lubrication system but includes an emergency gravity lubrication system that functions only in the event of failure of the pressurized lubrication system.

We claim:

1. Power transmitting apparatus comprising an outer casing defining a central chamber including a liquid lubricant sump, a movable member mounted for movement within said casing and operatively connected to gear means located within said chamber, a lubrication passage formed within said member, said passage having two openings to exterior of said member for the introduction of lubricant to said passage, first lubricant supply means supplying lubricant from said sump to one of said openings at a predetermined pressure, and second lubricant supply means supplying lubricant from said sump to the other of said openings at a pressure less than said predetermined pressure and means located in the other of said openings and preventing the flow of lubricant from said passage through the other of said openings.

2. The apparatus of claim 1, wherein said means comprise one-way valve means.

3. The apparatus of claim 2, wherein said one-way valve means permits the flow of lubricant from exterior of said member through said second opening upon the fluid pressure within said passage being less than the fluid pressure outside said member proximate said second opening.

4. The apparatus of claim 1, wherein said lubrication passage is included in a lubrication network formed within said member, said network including lubrication output passageways interconnecting said passage and points requiring lubrication contiguous the outer periphery of said member.

5. The apparatus of claim 1, wherein said first lubricant supply means includes a liquid pump interconnected with said sump, and drive means interconnecting said pump to said member such that said pump is driven upon movement of said member.

6. The apparatus of claim 1, wherein said second lubricant supply means includes at least a part of said gear means mounted within said chamber for movement through the lubricant in said sump thereby causing the splashing of lubricant within said chamber.

7. The apparatus of claim 6, wherein said second lubricant supply means further includes structural means within said chamber defining a lubricant catch basin for lubricant splashed by movement of said part of said gear means and also defining a liquid path allowing flow of lubricant due to the force of gravity from said catch basin to said second opening.

8. The apparatus of claim 1, wherein said arrangement comprises motor vehicle interaxle differential and output gear means transmitting power from said differential to the input of two vehicle driving axles, said member comprising the input shaft transmitting power originating at the vehicle prime mover to the interaxle differential.

9. A power transmitting device including an outer casing defining a central chamber, a power transmitting shaft rotatably journalled in said casing, a lubrication gallery formed within said shaft, said gallery having a first opening to exterior of said shaft interconnected to a source of pressurized lubricant to supply pressurized lubricant to said gallery, said gallery having a second opening to exterior of said shaft interconnected to a source of gravity fed lubricant, and one-way valve means positioned in said second opening and permitting fluid flow through said second opening only from exterior of said shaft into said gallery.

10. The device of claim 9, wherein said valve permits the flow of gravity fed lubricant through said second opening upon the pressure of said gravity fed lubricant being greater than the lubricant pressure within said gallery, whereby said gallery is supplied with lubricant in the event of an interruption of lubricant flow from said source of pressurized lubricant through said first opening.

11. The device of claim 9, wherein said source of pressurized lubricant includes a pump operatively connected to said shaft and operable upon rotation of said shaft.

12. An interaxle differential for proportioning power and permitting differential rotation between two vehicle drive axles, said differential comprising an outer casing defining a central chamber including a liquid lubricant sump, a power input shaft journalled for rotation within said casing, differential gear means driven by said shaft and driving both power transfer first gear means driving one of said axles and power transfer second gear means driving the other of said axles, a portion of said first gear means passing through said sump upon gear means movement to splash lubricant from said sump about said chamber, a lubrication gallery formed within said shaft and having two lubricant input openings, lubricant pump means operatively driven by said shaft and in communication with both said sump and one of said openings to direct pressurized lubricant from said sump to said gallery, structural means within said chamber defining a catch basin for splashed lubricant and a gravity fed liquid pathway from said catch basin to the other of said openings, and valve means positioned in the other of said openings and controlling fluid flow therethrough, said valve means prohibiting lubricant flow from said gallery through said other opening such that lubricant from said pump will pressurize said gallery and permitting the flow of lubricant into said gallery through said other opening upon the pressure of gravity fed lubricant in said pathway exceeding the lubircant pressure in said gallery, thereby to supply said gallery with lubricant upon an interruption of the supply of lubricant from said pump.

References Cited

UNITED STATES PATENTS

| | | | |
|---|---|---|---|
| 3,550,724 | 12/1970 | Vollmer | 184—11 R X |
| 3,441,106 | 4/1969 | Taylor et al. | 184—11 R X |
| 3,083,790 | 4/1963 | McAfee et al. | 184—6.12 |
| 2,968,190 | 1/1961 | Orr | 184—6.12 X R |

FOREIGN PATENTS

| | | | |
|---|---|---|---|
| 202,378 | 7/1956 | Australia | 184—6.12 |
| 1,047,820 | 12/1958 | Germany | 184—6.12 |

MANUEL A. ANTONAKAS, Primary Examiner

U.S. Cl. X.R.

184—11 R